(12) United States Patent
Schweinitzer et al.

(10) Patent No.: US 9,791,687 B2
(45) Date of Patent: Oct. 17, 2017

(54) MICROSCOPE AND METHOD FOR SPIM MICROSCOPY

(71) Applicant: Carl Zeiss Microscopy GmbH, Jena (DE)

(72) Inventors: Stefan Schweinitzer, Jena (DE); Philipp Sprengholz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 298 days.

(21) Appl. No.: 14/575,584

(22) Filed: Dec. 18, 2014

(65) Prior Publication Data
US 2015/0168706 A1    Jun. 18, 2015

(30) Foreign Application Priority Data

Dec. 18, 2013  (DE) .................. 10 2013 021 542

(51) Int. Cl.
| G02B 21/36 | (2006.01) |
| G02B 21/06 | (2006.01) |
| G02B 21/00 | (2006.01) |

(52) U.S. Cl.
CPC ......... *G02B 21/367* (2013.01); *G02B 21/008* (2013.01); *G02B 21/06* (2013.01); *G02B 21/364* (2013.01)

(58) Field of Classification Search
CPC .... G02B 21/008; G02B 21/06; G02B 21/364; G02B 21/367

(Continued)

(56) References Cited

U.S. PATENT DOCUMENTS

| 7,554,725 B2 * | 6/2009 | Stelzer .................. G02B 21/06 359/385 |
| 8,350,230 B2 | 1/2013 | Power et al. |

(Continued)

FOREIGN PATENT DOCUMENTS

| DE | 10 257 423 | 6/2004 |
| DE | 10 2007 045 897 | 4/2009 |

(Continued)

OTHER PUBLICATIONS

Huisken et al., Optical Sectioning Deep Inside Live Embryos by Selective Plane Illumination Microscopy, 2004, www.sciencemag.org Science, vol. 305, pp. 1007-1009; supplemental pp. 1-15.*

(Continued)

*Primary Examiner* — Christopher S Kelley
*Assistant Examiner* — Kathleen Walsh
(74) *Attorney, Agent, or Firm* — Haug Partners LLP

(57) ABSTRACT

A method for SPIM microscopy with a microscope winch includes (1) an illumination arrangement for illuminating a sample with a substantially planar light sheet, and (2) a detection arrangement for detecting light emitted by the sample with an objective. The sample is displaced through the light sheet in direction of the objective's optical axis, and the sample is illuminated under a first illumination angle and a second illumination angle. A plurality of sample planes are then detected at each illumination angle and stored as at least a first image stack and a second image stack. The image stacks are aligned relative to one another, and are combined in one image stack. A the three-dimensional image stack is projected into a two-dimensional rendering, sample features are aligned, a coordinate transformation is determined, and the coordinate transformation for alignment is applied to the combined image stack.

15 Claims, 5 Drawing Sheets

(58) Field of Classification Search
USPC .......................................................... 348/80
See application file for complete search history.

(56) References Cited

U.S. PATENT DOCUMENTS

| | | | | |
|---|---|---|---|---|
| 9,404,869 | B2* | 8/2016 | Keller | G01N 21/6486 |
| 2010/0177190 | A1* | 7/2010 | Chiang | G02B 21/26 |
| | | | | 348/79 |
| 2010/0201784 | A1* | 8/2010 | Lippert | G02B 21/002 |
| | | | | 348/46 |
| 2010/0309548 | A1* | 12/2010 | Power | G02B 21/008 |
| | | | | 359/385 |
| 2011/0115895 | A1* | 5/2011 | Huisken | G02B 21/0048 |
| | | | | 348/79 |
| 2012/0049087 | A1* | 3/2012 | Choi | G01N 21/4795 |
| | | | | 250/459.1 |
| 2013/0070054 | A1* | 3/2013 | Takaya | G02B 21/008 |
| | | | | 348/46 |
| 2013/0094755 | A1 | 4/2013 | Lippert et al. | |
| 2014/0126046 | A1* | 5/2014 | Shroff | G02B 21/06 |
| | | | | 359/385 |
| 2015/0143274 | A1* | 5/2015 | Hecht | G02B 21/008 |
| | | | | 715/771 |

FOREIGN PATENT DOCUMENTS

| | | |
|---|---|---|
| DE | 10 2007 047 461 | 4/2009 |
| DE | 10 2012 009 257 | 11/2013 |
| EP | 2 796 917 | 10/2014 |
| WO | WO 2004/053558 | 6/2004 |

OTHER PUBLICATIONS

Schonfeld et al., Reverse engineering using optical 3D sensors, 1998, SPIE, vol. 3313, pp. 115-125.*
Engelbrecht et al. "Resolution Enhancement in a Light-Sheet-Based Microscope (SPIM)", Optics Letters, Optical Society of America, vol. 31, No. 10, May 15, 2006, XP-001242795, pp. 1477-1479.
Huisken et al. "Optical Sectioning Deep Inside Live Embryos by Selective Plane Illumination Microscopy", Science, American Association for the Advancement of Science, US, Aug. 13, 2004, vol. 305, No. 5686, pp. 1007-1009, XP-002659026.
European Search Report for Application No. 14198503.6 dated Apr. 22, 2015.
German Search Report DE 10 2013 021 542.0 dated Nov. 21, 2014.
Christoph J. Engelbrecht et al., Resolution enhancement in a light-sheet-based microscope (SPIM), In: Optics Letters, vol. 31, No. 10, 2006, pp. 1477-1479.
Harald Schönfeld et al., Reverse engineering using optical 3D sensors, In: Proc. SPIE, vol. 3313, 1998, pp. 115-125.
Jan Huisken et at., Optical Sectioning Deep Inside Live Embryos by Selective Plane illumination Microscopy, www.sciencemag.com Science, vol. 305, 2004, pp. 1007-1009.
Paul J. Best et al., A Method for Registration of 3-D Shapes, In: IEEE Transactions on Pattern Analysis and Machine Intelligence, 14 1992, vol. 14. No. 2, pp. 239-256.
Stephan Preibisch et al. "*Mosaicing of Single Plane Illumination Microscopy Images Using Groupwise Registration and Fast Content-Based Image Fusion*", Proc. of SPIE vol. 6914, 69140E, (2008), doi: 10.1117/12.770893.

* cited by examiner

Fig. 2

Method Sequence (S: Method Steps)

S1. Capture of an image stack from at least two directions.

S2. Alignment of the one image stack with the coordinates of the other image stack.

S3. Superposition of the image stacks.

S4. Projection from the three-dimensional space into a two-dimensional rendering.

S5. The sample features which are contained in the rendering and which were captured from different directions are corrected with respect to the position of the sample features relative to one another.

S6. Determination of a transformation matrix from the position correction and application to the superposed image stacks from S3.

S7. Change of the view of the superposed image stack which is corrected in X and Y.

S8. Projection from the three-dimensional space into a two-dimensional rendering.

S9. New position correction of the sample features contained in the rendering relative to one another.

S10. Determination of a transformation matrix from the position correction and application to the superposed image stacks from S7.

S11. Change of the view of the image stack from S10 into the original view from S3

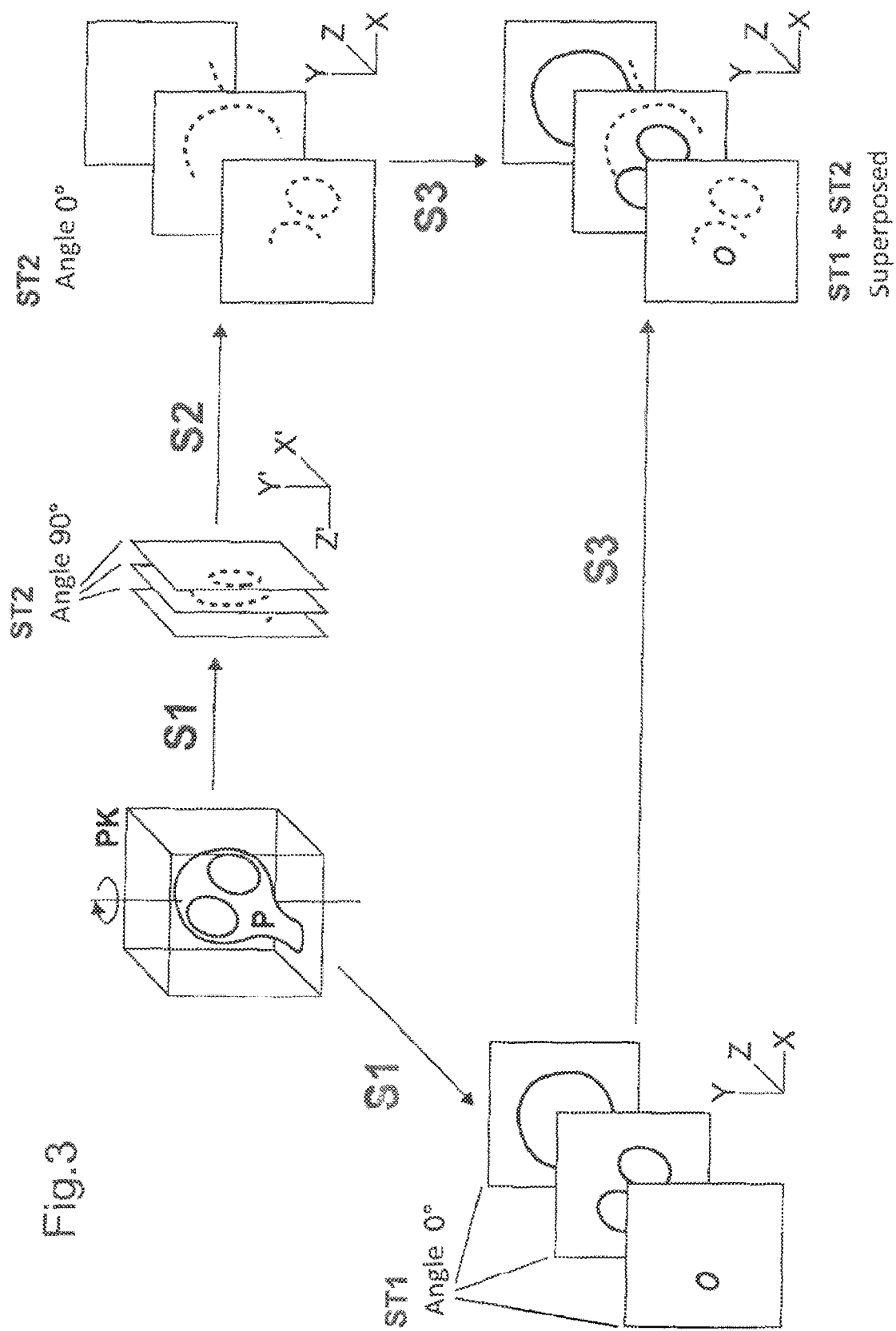

US 9,791,687 B2

MICROSCOPE AND METHOD FOR SPIM MICROSCOPY

The present application claims priority from German Patent Application No. DE 10 2013 021 542.0 filed on Dec. 18, 2013, the disclosure of which is incorporated herein by reference in its entirety.

FIELD OF THE INVENTION

It is noted that citation or identification of any document in this application is not an admission that such document is available as prior art to the present invention.

The invention is directed to a microscope which comprises an imaging objective for imaging a sample on a detector and means for illumination of the sample with a light sheet in the focal plane of the imaging objective or in a defined plane in the vicinity of this focal plane. The means for illumination comprise an illumination source emitting preferably coherent light.

A microscope in which the illumination beam path and detection beam path are arranged substantially perpendicular to one another and in which the sample is illuminated by a light sheet in the focal plane of the imaging objective, i.e., perpendicularly to the optical axis thereof, is configured for examination of samples using the method of selective plane illumination microscopy (SPIM). In contrast to confocal scanning microscopy (LSM) in which a three-dimensional sample is scanned point by point in individual planes at different depths and the image information acquired in so doing is subsequently compiled to form a three-dimensional image of the sample, SPIM technology is based on wide field microscopy and allows the sample to be imaged on the basis of optical sections through individual planes of the sample.

The advantages of SPIM technology reside inter alia in the faster speed at which image information is acquired, the reduced risk of photobleaching of biological samples and an expanded depth of penetration of the focus in the sample.

Basically, in SPIM technology fluorophores which are contained in or introduced into the sample are excited by laser light which is shaped to form a light sheet, as it is called. A selected plane in the depth of the sample is illuminated by the light sheet and an image of this sample plane is obtained in the form of an optical section with imaging optics. The rapid reciprocating motion of a thin, rotationally symmetrical laser beam in the focal plane of the imaging optics is essentially equivalent to excitation of this kind by a static light sheet. Accordingly, the shape of a SPIM light sheet also results effectively, i.e., time-averaged over the period of observation.

SPIM technology is described, for example, in Stelzer et al., *Optics Letter* 31, 1477 (2006), Stelzer et al., *Science* 305, 1007 (2004), DE 102 57 423 A1, and WO 2004/053558 A1.

The described light sheet microscopy combines optical sections with a widefield detection via a spatially resolving camera (CCD camera) in that the entire lateral focal plane (XY plane) of the detection objective is illuminated with a thin light sheet. The light sheet illumination is carried out at a right angle to the detection axis (Z axis).

The sample is placed in the area of overlap of illumination and detection. Fluorescence signals which are excited by the illumination light sheet are imaged on the camera over the entire field of view of the detection objective. As a result of the right-angled illumination with a thin light sheet, only a small portion of the axial extension of the detection optics is illuminated and, therefore, an optical section is generated. In order to observe a different region in the sample, the sample is moved through the light sheet with a sample positioning unit independently from the optics. By capturing optical sections at different sample positions along the detection axis, it is possible to capture three-dimensional image stacks. These image stacks can subsequently be reconstructed to form 3D images. An image stack includes 200 images, for example.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph), such that applicant(s) reserve the right to disclaim, and hereby disclose a disclaimer of any previously described product, method of making the product, or process of using the product.

SUMMARY OF THE INVENTION

FIG. 1 shows the basic construction of a SPIM microscope for implementing the method according to the invention. A sample P which may be located in a sample chamber PK, this sample or sample chamber PK being displaceable in X, Y and Z directions and arranged so as to be rotatable perpendicular to the drawing plane, is detected by a detection beam path. This detection beam path comprises a detection objective O with a detection axis or optical axis which extends in Z direction and to which are connected in detection direction a preferably exchangeable light filter F, a tube lens TL and a surface receiver CCD.

Substantially perpendicular to the detection axis Z, in this case in X direction, there are an illumination beam path comprising in this case two lasers L1, L2 which are coupled via a beamsplitter BS and which penetrate the sample via an AOTF for wavelength selection and intensity adjustment, a deflecting mirror S, a beam expander BE and anamorphic optics such as, in this case, a cylindrical lens ZL for beam shaping, which generate planar light distribution.

Shown schematically is an adjusting unit BLjust which, for example, can adjust or tilt elements S, BE and ZL in a plurality of directions.

A shared monitoring-and-control device CU, generally formed by a computer and a display unit (display), is connected to all of the adjusting devices such as the AOTF, sample displacement means or sample chamber displacement means (allows the sample or sample chamber to be displaced in X, Y and Z directions as well as in rotation around Y) and the illumination adjustment means BLjust to carry out the method according to the invention.

The sample is placed in the area of overlap of illumination and detection. Fluorescence signals are imaged on a camera over the entire field of view of the detection objective. As a result of the right-angled illumination with a thin light sheet, only a small axial portion of the detection volume is illuminated and, therefore, an optical section is generated. In order to observe a different region in the sample, the sample is moved through the light sheet with a sample positioning unit independently from the optics. By capturing optical sections at different sample positions along the detection axis, it is possible to generate three-dimensional image stacks. These image stacks can be captured from different angles. An image stack captured under a determined angle is also referred to as a view. A plurality of image stacks captured under a determined angle can be put together to form a 3D image which contains image information from all of the image stacks. This process is called registration.

Currently, methods are used for registration which automatically join the individual capture angles to form an image with the aid of references (e.g., fluorescing beads as artificial orientation points) or grayscale intensities. This results in a view which is called a reference image and in further views from different angles which are searched for correspondences with the reference image. If sufficient correspondences are found, transformation matrices can be calculated. By means of the latter, each view is subsequently transformed to the reference image. Finally, all of the views are fused in a result image.

Automatic searching for correspondences is a computing-time-intensive process which does not always produce the desired outcome, since erroneous correspondences or no correspondences may be found depending on the sample. Also, the use of fixed references (e.g., beads) which generally enable improved registration cannot always be guaranteed because this requires a substantially more time-intensive sample preparation. In addition, beads are often not wanted by the user because they lead to image distortions or can have a biological influence on the sample.

One solution to these problems is a manual registration or a controlling of the search for correspondences. Due to the three-dimensional shape of the images and the many degrees of freedom resulting therefrom (translation, rotation, scaling, shear, etc.), a simple and fast procedure is needed.

The solution to this problem is an at least partially manual registration method which overcomes the disadvantages of the three-dimensionality of the individual capture angles. Prior to this, the coordinate systems of all of the image stacks (views) are rotated around the Y axis by their capture angles. The image stacks then appear as if they were captured from the same capture angle. A manual alignment or positioning can then be carried out by means of superposing the image stacks. This positioning happens in at least two steps and is realized by maximum intensity projections of the image stacks.

In the first step, the maximum intensities of the image stacks are projected along the Z axis. Subsequently, the resulting 2D images of the different image stacks are positioned on the 2D image of the reference angle through suitable transforms (e.g., rigid, affine or elastic). This transform is them applied to the associated image stacks (therefore, in 3D).

In the second step, the maximum intensities of the image stacks are projected along the Y axis, and the resulting 2D images of the different image stacks (views) are once again positioned on the 2D image of the reference angle through suitable transformations. Once again, the acquired transformation is applied to the associated image stacks.

This results in a fused image stack which has been registered manually from different capture angles. This is also possible manually in a highly efficient manner through the positioning in 2D and requires no complicated automated registration process. Further, it is not necessary to introduce beads into the sample because the positioning can take place by means of sample structures themselves.

The manual registration process is not limited to the solution described above. In particular, the following modifications are possible:

Projections along the X axis can also be used for alignment in addition to the above-described projections along the Z axis and Y axis.

Only a freely selected sequence of at least two projections preferably extending orthogonal to one another is required for alignment. This means that alignment can be carried out, e.g., changing arbitrarily between top view, front view and side view.

Different types of transformations can be used for aligning the individual projections. These include, for example, rigid, affine, elastic or locally elastic transformations. Limiting the degrees of freedom is possible.

The described workflow can be partially automated. For example, it is possible to align the projections in an automated manner.

Instead of the maximum intensity projection, other variants of projection are possible. For example, the sub-volume maximum intensity projection or the minimum intensity projection.

Captures with views composed from a plurality of channels (in spectrally different manner) can also be manually registered. To this end, the same channels are to be used for alignment of different views.

Manual multi-view registration can be applied without limiting to time-series captures. In this regard, it is conceivable for example that the first time point is registered manually and the resulting transformation matrices are subsequently applied automatically to all of the subsequent time points.

BRIEF DESCRIPTION OF THE DRAWINGS

FIG. 2 lists the basic sequence of the method according to the invention in method steps S1-S11;

FIG. 3 shows the sample chamber PK (see FIG. 1) which is rotatable around a perpendicular axis;

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 2 lists the basic sequence of the method according to the invention in method steps S1-S11:

S1. Capture of an image stack from at least two directions.
S2. Alignment of the one image stack with the coordinates of the other image stack.
S3. Superposition of the image stacks.
S4. Projection from the three-dimensional space into a two-dimensional rendering.
S5. The sample features which are contained in the rendering and which were captured from different directions are corrected with respect to the position of the sample features relative to one another.
S6. Determination of a transformation matrix from the position correction and application to the superposed image stacks from S3.
S7. Change of the view of the superposed image stack which is corrected in X and Y. Top view is selected in FIG. 3.
S8. Projection from the three-dimensional space into a two-dimensional rendering.
S9. New position correction of the sample features contained in the rendering relative to one another.
S10. Determination of a transformation matrix from the position correction and application to the superposed image stacks from S7.
S11. Change of the view of the image stack from S10 into the original view from S3 (front view in the example).

The procedure will be described in more detail in FIGS. 3 to 5 with reference to the above-mentioned method steps.

FIG. 3 shows the sample chamber PK (see FIG. 1) which is rotatable around a perpendicular axis. By rotating the sample chamber and moving the light sheet through the sample by a Z-displacement of the sample chamber and/or of the light sheet, image stacks from different illumination angles of the light sheet are captured via the objective. For example, as was stated above, the capture can take place under illumination axes z, z' which are perpendicular to one another.

Without limiting generality, other, different capture angles are also possible, also, for example, three captures under an angular offset of 30 degrees, for example.

Figure 1:
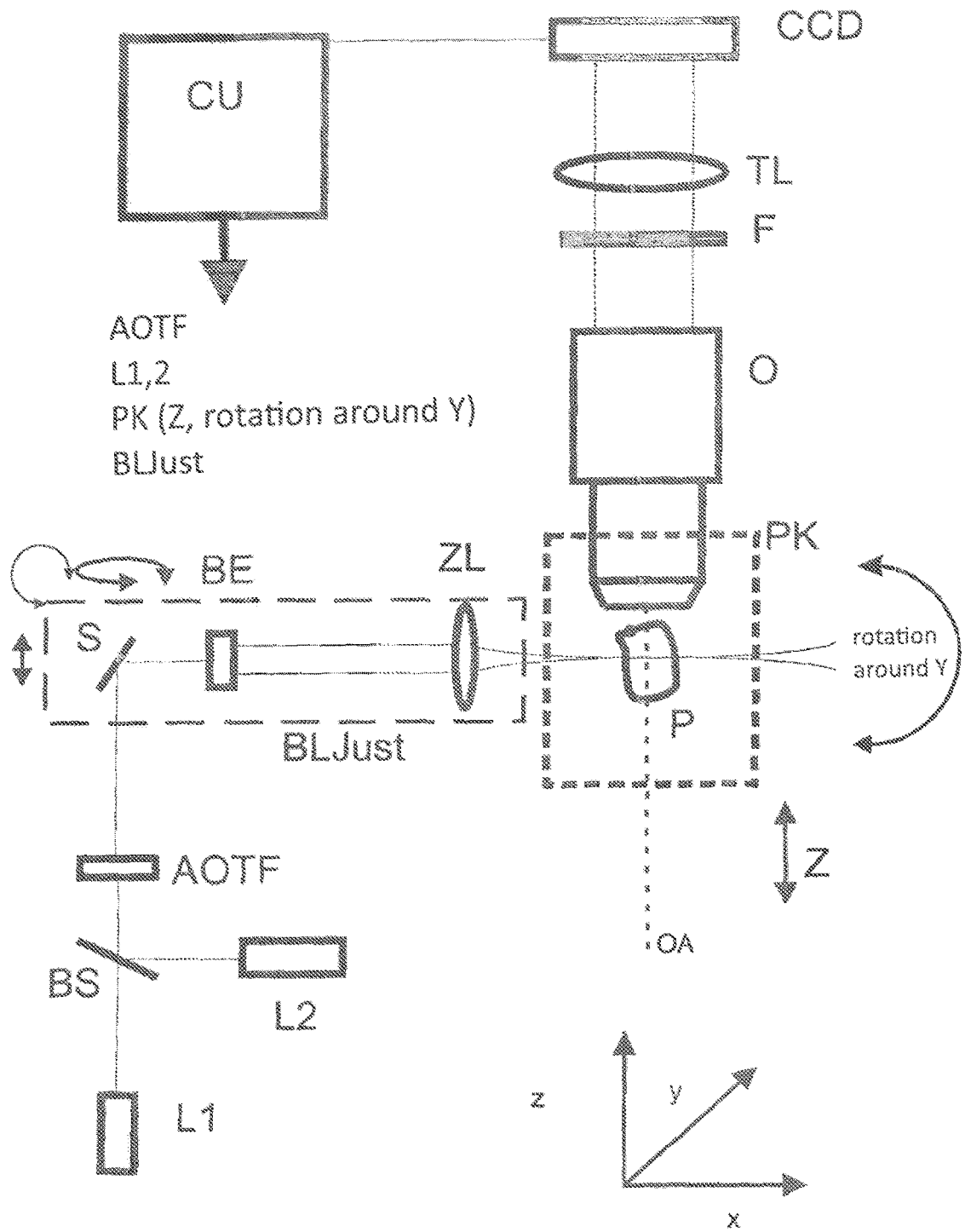
FIG. 1 shows the basic construction of a SPIM microscope for implementing the method according to the invention.

By moving the light sheet in Z direction, stacks of recorded images are made which are stored in the image storage (CU in FIG. 1).

A stack of individual images ST1 and ST2 which were captured at angles of 0 and 90 degrees are shown schematically. Different object details of the sample are shown schematically in ST1 and ST2.

The three individual images are selected in this instance merely in the interest of clarity; each stack can include 1000 individual mages, for example.

The quantity of individual images per stack need not be identical in order to carry out the method according to the invention.

In step S2 in FIG. 3, the orientation of stack ST2 is adapted to the orientation of stack ST1, i.e., its coordinate system is rotated by 90 degrees along the depicted y axis.

In the next step S3, identically oriented image stacks ST1 and ST2 are superposed in a collective stack ST1+ST2. In doing so, the exact sequence of individual images is not crucial; for example, ST2 can also be arranged behind ST1.

It follows from the above-mentioned different quantity of individual images of ST1 and ST2 which is possible in principle that the Z-distances between the individual images can also vary during capture.

The image stacks can also have a lateral offset or the individual images in ST1 and ST2 can have different dimensions in lateral direction.

Figure 4:
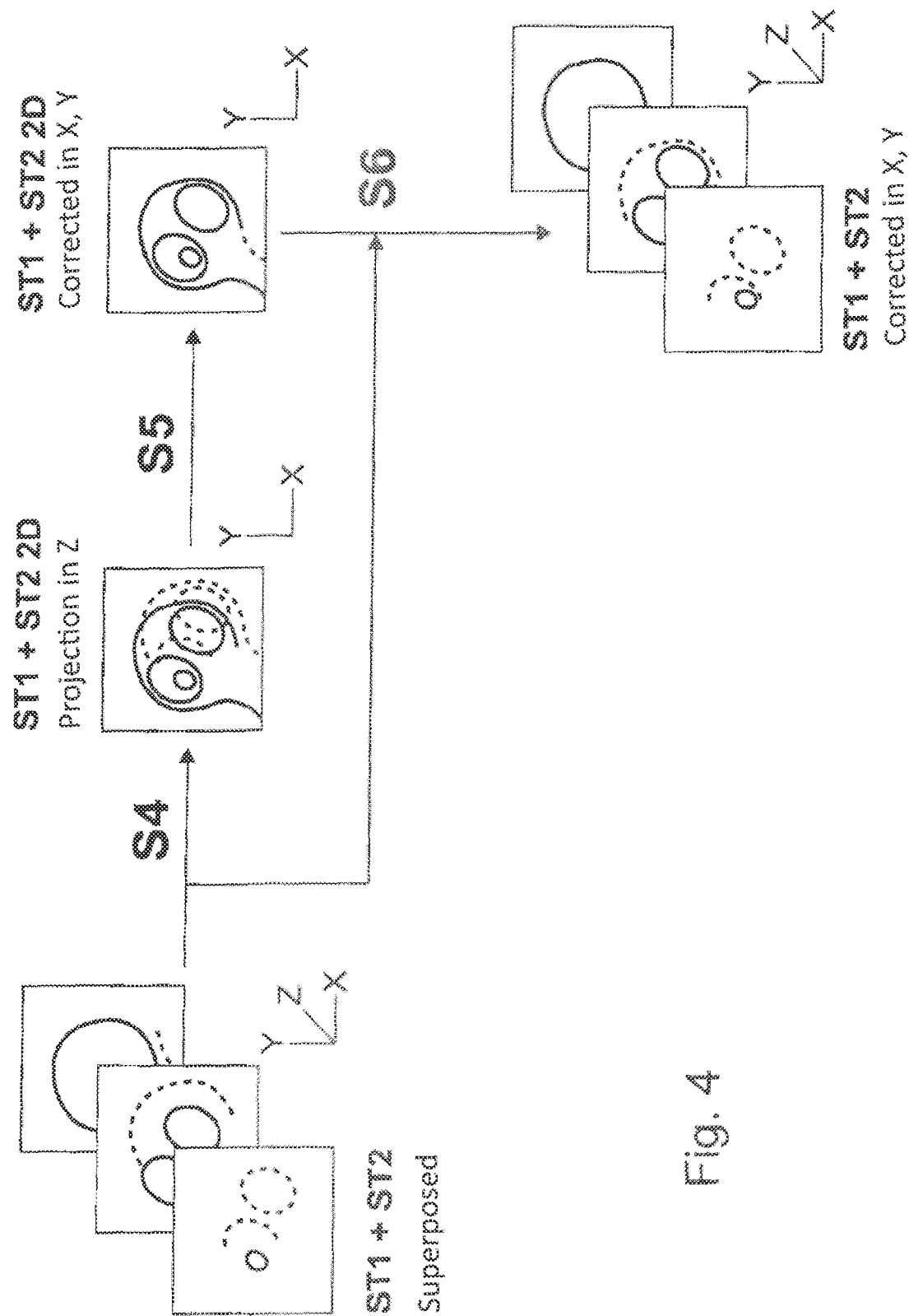
In FIG. 4, a projection from the three-dimensional rendering into a two-dimensional rendering is carried out in Step 4; and In FIG. 5 in step S7, based on this image stack, a reorientation into ST1+ST2 VO is carried out in and a top view in direction of the Y axis is generated.
Figure 5:
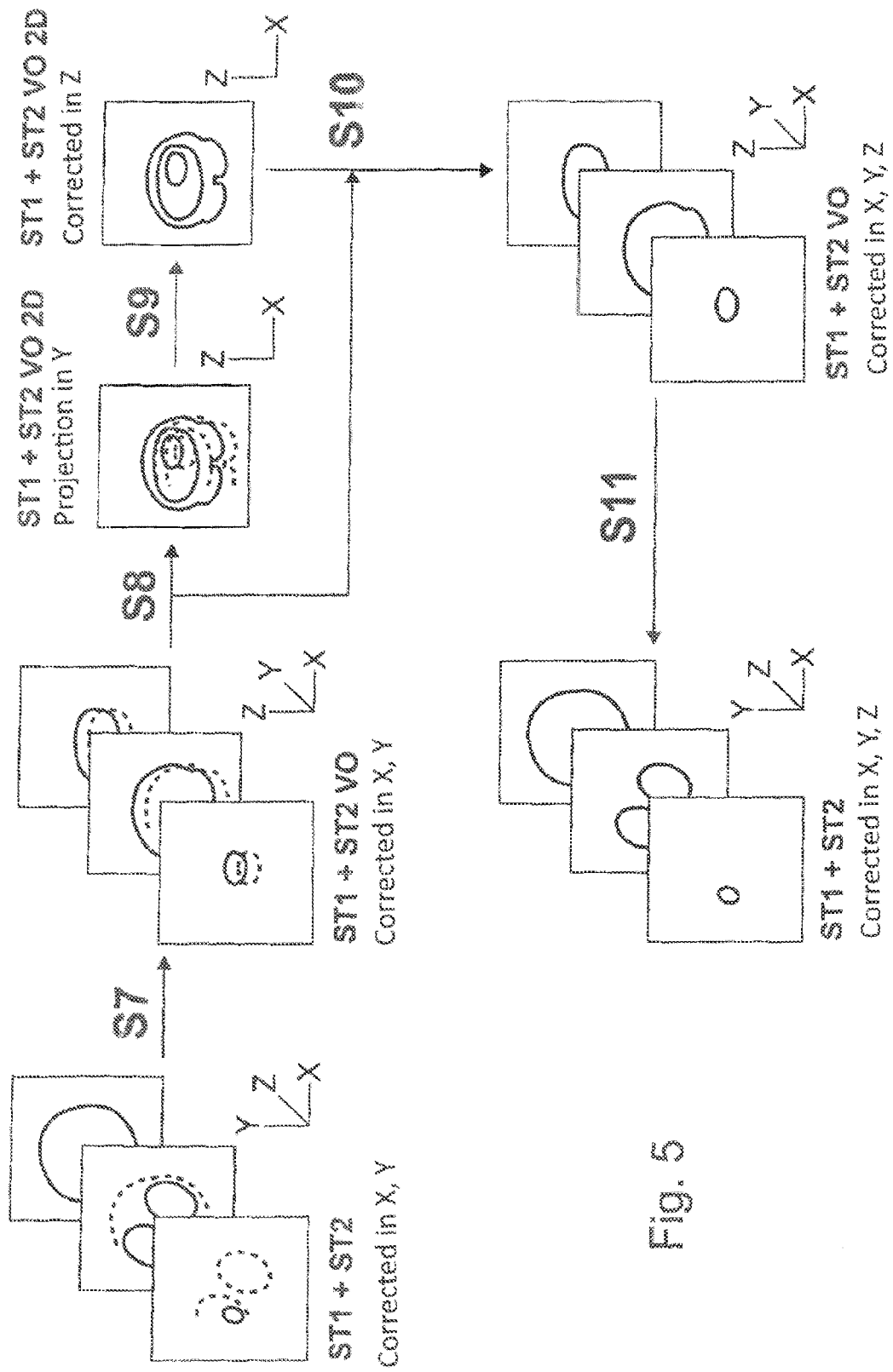

In FIG. 4, a projection from the three-dimensional rendering into a two-dimensional rendering is carried out in Step 4.

In this case, the image pixel of an individual image having the greatest intensity is determined pixel by pixel in Z-direction (axially), for example, with reference to the image pixels of an image from ST1, from the superposed images in Z-direction. Instead of a maximum intensity, a determined intensity threshold can also be selected or the minimal intensity in Z-direction can also be determined.

When this is carried out for all image pixels, a two-dimensional rendering ST1+ST2 2D results, which contains image data from ST1 and from ST2 (shown in dashes) as is shown schematically. These data may be displayed differently to the user.

In step S5, a displacement and/or rotation of the individual images ST1 and ST2 in the 2D rendering, in this case in the X/Y plane, is carried out by the user via input means (CU in FIG. 1) or in an automated manner, or initially roughly in an automated manner and then finely by the user and, accordingly, a correction of the image position of ST1 and ST2 relative to one another is carried out. For this purpose, the two image datasets ST1 and ST2 are separated from each other in the 2D plane and displaceably/rotatably, generally transformably, arranged.

The displacements/rotations which are carried out are detected in the CU and transformed into a mathematical coordinate transformation for the X/Y coordinates in the two-dimensional rendering.

For example and without limitation, this can be an affine transformation. This transformation is applied (step S6) to the superposed image stack ST1+ST2 as it was before step S4 resulting in a three-dimensional image stack that is corrected with respect to X/Y. In FIG. 5 in step S7, based on this image stack, a reorientation into ST1+ST2 VO is carried out in and a top view in direction of the Y axis is generated. This top view still contains structure features of ST1 and ST2 and, in a manner analogous to step S4, a two-dimensional rendering is generated in step S8 from the three-dimensional rendering through intensity analysis, but this time in Y direction. In this subsequent two-dimensional rendering, sample features from ST1 and ST2 which are distinguishable and displaceable/rotatable individually again lie in the X/Z plane. In step S9, in turn in a manner analogous to S5, the automated and/or manual alignment and superposition relative to one another is carried out by determining a coordinate transformation which, in a manner analogous to S6, leads in S10 to a three-dimensional rendering which is now aligned in X/Z direction as also previously already in X/Y direction with respect to the sample details and is available for further rendering or storage and subsequent examination in CU.

In step S11, restoral to the original orientation as after step S3 with the axial direction in Z direction can take place in order better to mirror the original capture conditions.

As was mentioned before, there can be more than two image stacks, for example, three image stacks captured at 30 degrees. In an advantageous manner, however, this does not lead to an increase in the above-described method steps; rather only more than two image stacks are overlaid and reduced to two coordinates in the two different orientations as was shown in FIG. 3.

A graphical user interface (GUI) which is conventional in the art can be used on a screen as means for the user, for example, with a plurality of sliders for X-, Y- and Z-displacement and for rotation.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method for selective plane illumination microscopy ("SPIM") with a microscope;
wherein the microscope comprises:
an illumination arrangement comprising
an illumination light source; and
an illumination beam path configured to illuminate a sample with a light sheet;
a detection arrangement configured to detect light emitted by the sample with an objective;
wherein the light sheet is substantially planar in a focus of the objective or in a defined plane in a vicinity of the focus of the objective, and the objective has an optical axis which intersects the plane of the light sheet at an angle different than zero;
wherein the method comprises:
displacing the sample through the light sheet in direction of the optical axis of the objective to detect different sample planes;
illuminating the sample is under at least a first illumination angle and a second illumination angle;
detecting a plurality of sample planes at each illumination angle, and storing the sample planes as at least a first image stack and a second image stack; and
wherein the method further comprises:
a step 1 of aligning the first and second image stacks relative to one another so that coordinate systems of all of the image stacks are aligned in a coordinate system of the first image stack;
a step 2 of combining the first and second image stacks into a three-dimensional combined image stack;
a step 3 of projecting the three-dimensional combined image stack into a two-dimensional rendering;
a step 4 of aligning sample features captured from different illumination directions of the two-dimensional rendering relative to one another with respect to position;
a step 5 of determining a coordinate transformation from coordinates of the aligned sample features; and
a step 6 of applying the coordinate transformation for alignment to the combined image stack.

2. The method according to claim 1;
wherein the orientation of the combined image stack is changed, and steps 2-6 are applied to the newly oriented combined image stack to generate a three-dimensionally oriented image stack.

3. The method according to claim 2;
wherein the three-dimensionally oriented image stack is adjusted with respect to its orientation to an original illumination direction.

4. The method according to claim 1;
wherein the coordinate transformation is a rigid transformation or an affine transformation or an elastic transformation or a locally elastic transformation.

5. The method according to claim 1;
wherein an intensity comparison is carried out in each instance between the images in step 3 within the combined image stack for the individual pixels of the images.

6. The method according to claim 5;
wherein a pixel with a maximum value or minimum value or a predefined threshold value or the average or the median is utilized.

7. The method according to claim 1;
wherein the alignment according to step 4 is carried out in a computer through image analysis and/or via input means for a user.

8. The method according to claim 7;
wherein a rough alignment is provided in the computer and a fine alignment is provided via input means.

9. The method according to claim 1;
wherein the at least first image stack and second image stack are detected in at least two spectral regions for acquiring different fluorescence markers.

10. The method according to claim 9;
wherein a first image stack and a second image stack with identical or similar spectral region are utilized to carry out steps 1-6.

11. The method according to claim 1;
wherein, during time-series captures, steps 1-6 are carried out at a first time point and the determined coordinate transformations are applied to image stacks captured at further time points.

12. The method according to claim 1;
wherein steps 1-6 are repeated at a plurality of time points of a time series during time-series captures.

13. A non-transitory computer-readable storage medium comprising a computer program configured to implement the method according to claim 1.

14. A microscope for selective plane illumination microscopy ("SPIM") comprising:
an illumination arrangement comprising
an illumination light source; and
an illumination beam path configured to illuminate a sample with a light sheet;
a detection arrangement configured to detect light emitted by the sample with an objective;
wherein the light sheet is substantially planar in a focus of the objective or in a defined plane in a vicinity of the focus of the objective, and the objective has an optical axis which intersects the plane of the light sheet at an angle different than zero; and
wherein the microscope is configured to implement the method according to claim 1.

15. The microscope according to claim 14, further comprising:
a graphical user interface (GUI) for implementation of at least step 4 by a user.

* * * * *